(12) United States Patent
Yoshimi

(10) Patent No.: US 9,387,763 B2
(45) Date of Patent: Jul. 12, 2016

(54) POWER SOURCE DEVICE FOR VEHICLE

(75) Inventor: Nobuhiko Yoshimi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 413 days.

(21) Appl. No.: 14/119,690

(22) PCT Filed: Jun. 25, 2012

(86) PCT No.: PCT/JP2012/066123
§ 371 (c)(1),
(2), (4) Date: Nov. 22, 2013

(87) PCT Pub. No.: WO2013/002167
PCT Pub. Date: Jan. 3, 2013

(65) Prior Publication Data
US 2014/0091619 A1    Apr. 3, 2014

(30) Foreign Application Priority Data
Jun. 28, 2011    (JP) .................................. 2011-143236

(51) Int. Cl.
*B60L 1/00* (2006.01)
*B60L 3/00* (2006.01)
(Continued)

(52) U.S. Cl.
CPC ................. *B60L 1/00* (2013.01); *B60L 3/0092* (2013.01); *B60L 11/1861* (2013.01);
(Continued)

(58) Field of Classification Search
CPC .................................. B60L 1/00; B60L 11/12
USPC ........................................................ 307/9.1
See application file for complete search history.

(56) References Cited

U.S. PATENT DOCUMENTS 5,780,980 A * 7/1998 Naito ....................... B60K 6/28
                                                                    307/19
2008/0067973 A1   3/2008 Ishikawa et al.
(Continued)

FOREIGN PATENT DOCUMENTS

JP    A-08-214409    8/1996
JP    A-2006-050779   2/2006
(Continued)

OTHER PUBLICATIONS

Sep. 25, 2012 International Search Report issued in Application No. PCT/JP2012/066123.

*Primary Examiner* — Carlos Amaya
(74) *Attorney, Agent, or Firm* — Oliff PLC

(57) ABSTRACT

A vehicle power source device reliably turns on a high voltage battery even if the output voltage of a low-voltage ancillary battery drops at the start of driving the vehicle. A request to run on a high-voltage battery (to turn on a relay contact point) is made by means of the operation to start driving a vehicle. A low-voltage ancillary battery and an auxiliary battery supply power to a power source circuit. A relay control unit supplied with power from the power source circuit turns on the relay contact point and turns on the high-voltage battery. When the high-voltage battery is on, the auxiliary battery is charged by means of a step-down circuit. The auxiliary battery holds the charged power by means of a diode without the power being consumed by a group of low-voltage loads.

4 Claims, 3 Drawing Sheets

(51) Int. Cl.
*H02G 3/00* (2006.01)
*B60L 11/18* (2006.01)
*B60L 15/20* (2006.01)

(52) U.S. Cl.
CPC ............ *B60L 11/1868* (2013.01); *B60L 15/20* (2013.01); *B60L 2210/12* (2013.01); *B60L 2240/547* (2013.01); *B60L 2260/22* (2013.01); *B60L 2260/26* (2013.01); *Y02T 10/645* (2013.01); *Y02T 10/7005* (2013.01); *Y02T 10/7044* (2013.01); *Y02T 10/7066* (2013.01); *Y02T 10/7233* (2013.01); *Y02T 10/7275* (2013.01)

(56) References Cited

U.S. PATENT DOCUMENTS

| | | | |
|---|---|---|---|
| 2010/0141213 | A1 | 6/2010 | Iida |
| 2011/0187184 | A1 | 8/2011 | Ichikawa |
| 2014/0021800 | A1* | 1/2014 | Kang .................. B60L 11/1805 307/115 |

FOREIGN PATENT DOCUMENTS

| | | |
|---|---|---|
| JP | A-2007-244034 | 9/2007 |
| JP | A-2008-149897 | 7/2008 |
| JP | A-2008-306823 | 12/2008 |
| JP | A-2009-225587 | 10/2009 |

* cited by examiner

POWER SOURCE DEVICE FOR VEHICLE

BACKGROUND

Some of the disclosed embodiments relate to a hybrid vehicle or an electric vehicle, and in particular to a power source device for a vehicle provided with a high-voltage battery that supplies power to a driving motor.

Related art hybrid vehicles or electric vehicles are provided with a driving motor, and a high-voltage battery that supplies power to the driving motor. A relay contact is arranged for wiring the driving motor and the high-voltage battery. According to operations that begin and end driving, the relay contact is turned on and off.

FIG. 1 is a block diagram showing a structure of significant or main parts of a related art power source device for a vehicle used for a hybrid vehicle or an electric vehicle. Such a related art power source device for a vehicle includes: (i) a driving motor 1a, (ii) a high-voltage load 1 that is a circuit attached to the driving motor 1a, (iii) a high-voltage battery 2 that supplies power to the high-voltage load 1, and (iv) a relay contact 3 that is arranged on a path by which the high-voltage battery 2 supplies power to the high-voltage load 1, and which opens and closes the path. The high-voltage load 1 is supplied power from the high-voltage battery 2 via the relay contact 3. Furthermore, in the case of a hybrid vehicle, the high-voltage load 1 having the driving motor 1a also functions as a generator that works together with an engine (not shown).

A relay controller 40 within a high-voltage power source controller 4 controls on and off operations of the relay contact 3. The relay controller 40 is provided with control signals corresponding to operations of a power switch (not shown) that begins and ends driving, and the relay contact 3 is turned on and off. Based upon the operation that begins the driving, the relay controller 40 receives a control signal that requests that the relay contact 3 be turned on. When the relay contact 3 is turned on, the relay controller 40 supplies excitation power to a relay coil (not shown) arranged in the vicinity of the relay contact 3.

The high-voltage power source controller 4 has a power source circuit 41 that supplies power to the relay controller 40, and the power source circuit 41 is supplied with power from a low-voltage auxiliary device battery 6, which is described below. If the relay controller 40 receives, by the operation that ends the driving, a control signal that requests that the relay contact 3 be turned off, the relay controller 40 stops feeding power to the relay coil and turns the relay contact 3 off. The high-voltage battery 2 stops supplying power to the high-voltage load 1.

A related art power source device for a vehicle also includes: (i) a low-voltage load group 5 that is an on-board auxiliary device group, and (ii) a low-voltage auxiliary device battery 6 that supplies power to the low-voltage load group 5. A step-down circuit 70 within a DCDC converter 7 is connected between: (a) a connecting node of the high-voltage load 1 and the relay contact 3, and (b) a cathode terminal of the low-voltage auxiliary device battery 6. Normally, the step-down circuit 70 steps down an output voltage (absolute value) of the high-voltage battery 2 that has been received through the relay contact 3 at the time of driving and provides it to a low-voltage auxiliary device battery 6 side terminal. The step-down circuit 70 is controlled by a control signal from a controller (not shown). The DCDC converter 7 has a power source circuit 71 that supplies power to the step-down circuit 70, and the power source circuit 71 is supplied power from the low-voltage auxiliary device battery 6.

The power source circuit 41 that supplies power to the relay controller 40 is supplied power from the low-voltage auxiliary device battery 6. If the driving of the vehicle begins, in order to turn on the relay contact 3, the relay controller 40 supplies excitation power to the relay coil arranged in the vicinity of the relay contact 3. At this point, if the remaining capacity of the low-voltage auxiliary device battery 6 is low, then the power circuit 41 cannot supply power to excite the relay coil.

Japanese Published Patent Application 2007-244034 (JP 034) discloses a power source device for a vehicle that increases a possibility of transferring a vehicle state to a traveling state, even in a state in which an auxiliary device battery (low-voltage auxiliary device battery 6) voltage decreases. In this power source for a vehicle, a system main relay SMRP is arranged in parallel with a system main relay SMRB (relay contact 3). Drive electricity of the system main relay SMRP is smaller than that of the system main relay SMRB. A controller controls opening and closing of the system main relays SMRB and SMRP.

If the auxiliary device battery voltage decreases, the controller closes the system main relay SMRP, the power source voltage of the main battery (high-voltage battery 2) is supplied to a DC/DC converter (step-down circuit 70), and the DC/DC converter steps down the power source voltage and provides it to the controller. By so doing, the controller closes the system main relay SMRB and shifts the vehicle state to a traveling state.

SUMMARY

However, in the power source device for a vehicle described in JP 034, if the auxiliary device battery voltage decreases, then it is the DC/DC converter that supplies, to the controller, power by which the controller shifts a state of the system main relay SMRB to a closed state. Depending on the remaining capacity of the auxiliary device battery, an operating status of the auxiliary device load circuit (low-voltage load group 5) to which the auxiliary device battery supplies power, etc., the auxiliary device battery cannot even supply power that drives the DC/DC converter. In the power source device for a vehicle described in JP 034, in this case, a problem arises that the state of the system main relay SMRB cannot be shifted to a closed state, and that the vehicle cannot be placed in a state in which it can travel.

Some of the disclosed embodiments address the above-mentioned situation, and thereby provide a power source device for a vehicle that reliably turns a high-voltage battery on, and can make a vehicle travel even if an output voltage of a low-voltage auxiliary device battery deteriorates when there is a demand for turning the high-voltage battery on by an operation that begins driving of the vehicle.

A power source device for a vehicle in accordance with a first embodiment includes: a first battery that supplies power to a driving motor of the vehicle; a switch that is connected between a cathode terminal of the first battery and the driving motor; a controller that controls on and off of the switch; a second battery that supplies power to an electric load mounted in the vehicle; a step-down circuit that is connected between: (i) a terminal of the switch that is at a side of the driving motor, and (ii) a cathode terminal of the second battery, steps down an output voltage of the first battery, and provides the stepped-down voltage to a cathode terminal of the second battery; a first power source circuit that supplies power to the controller; and a second power source circuit that supplies power to the step-down circuit. The first and second power source circuits are supplied with power from the second battery. A diode is connected, in a forward direction, between: (i) a connecting node of the step-down circuit and the second battery, and (ii) a connecting node of the first and second power source circuits. The device also includes a third battery, a cathode terminal of which is connected to a cathode of the diode.

In this power source device for a vehicle, the second battery supplies power to the first and second power source circuits via the diode. The third battery is connected to the cathode of the diode, and to the first and second power source circuits, and supplies power to the first and second power source circuits. The controller, to which power has been supplied by the first power source circuit, turns the switch on and off.

The controller receives a signal, for example, corresponding to an operation that begins driving, and turns the switch on. If the switch is turned on, then the first battery supplies power to the driving motor via the switch, which results in a state in which the vehicle can travel. The first battery is also connected to the step-down circuit via the switch. The step-down circuit is connected between the switch and the second battery, and provides a voltage to a second battery side terminal by increasing the output voltage of the first battery. The second battery side terminal of the step-down circuit is also connected to the third battery via the diode. The step-down circuit provides the second and third batteries a voltage that is stepped down from the output voltage of the first battery, and the second and third batteries are charged with power. The second battery is also connected to an electric load, and power is supplied to the electric load.

The third battery is connected via the electric load and the diode, and the diode is connected between the third battery and the electric load in a reverse direction. Because of the diode, the output power of the third battery is not consumed in the electric load.

If the controller receives a signal, for example, corresponding to an operation that ends driving and turns the switch off, the driving motor does not receive power from the first battery and the driving of the vehicle ends.

The power source device for a vehicle in accordance with a second embodiment includes: a second switch that is connected between: (i) a cathode terminal of the third battery and (ii) the connecting node of (a) the first and second power source circuits, and (b) the diode; a series circuit of a current limiting resistor and a third switch, the series circuit being connected in parallel to the second switch; receiving means (such as a receiver) that receives a signal that demands that the switch be turned on; determining means (such as a determiner) that determines that the switch is turned on; detecting means (such as a detector) that detects an output voltage of the third battery; and comparing means (such as a comparator) that compares the voltage detected by the detecting means with a predetermined voltage. If the receiving means receives the signal, then the second switch is turned on; and if the determining means determines that the switch is turned on, then the second switch is turned off and the third switch is turned on. A second controller turns off the third switch if the output voltage of the third battery exceeds the predetermined voltage upon comparing by the comparing means.

In this power source device for a vehicle, if the second controller receives a signal indicating that the receiving means demands that the switch be turned on, the second switch is turned on. The third battery supplies power to the first and second power source circuits via the second switch. There is no current limiting resistor on a path by which the third battery supplies power to the first and second power source circuits, so the third battery supplies power without power being lost.

If the controller to which power has been supplied by the first power source circuit turns the switch on, the determining means determines that the switch is turned on. If the determining means determines that the switch is turned on, the second controller turns the second switch off, and turns the third switch on. The step-down circuit steps down the output voltage of the first battery that has been given via the switch and gives a voltage to the third battery via the third switch and the current limiting resistor that is connected in series to the third switch.

The comparing means compares the output voltage of the third battery detected by the detecting means with a predetermined voltage, and if the output voltage of the third battery exceeds a predetermined voltage, then the second controller turns the third switch off. In this case, the second switch is also turned off, and so the second and third switches are turned off. The third battery holds charged power. If the receiving means again receives a demand for turning the switch on, the controller reliably turns the switch on by power supplied by the third battery regardless of the output voltage of the second battery.

A power source device for a vehicle in accordance with a third embodiment is configured such that the third battery is a lithium ion battery or a nickel hydrogen battery.

In this power source device for a vehicle, the third battery is constituted by a lithium ion battery or a nickel hydrogen battery.

A power source device for a vehicle in accordance with some of the disclosed embodiments reliably turns the high-voltage battery on, and can result in a state in which the vehicle can travel even if the output voltage of the low-voltage auxiliary device battery deteriorates when there is a demand for turning the high-voltage battery on by the operation that begins driving the vehicle.

DETAILED DESCRIPTION OF THE EMBODIMENTS

A few embodiments are detailed below for exemplary purposes only.

Figure 1:
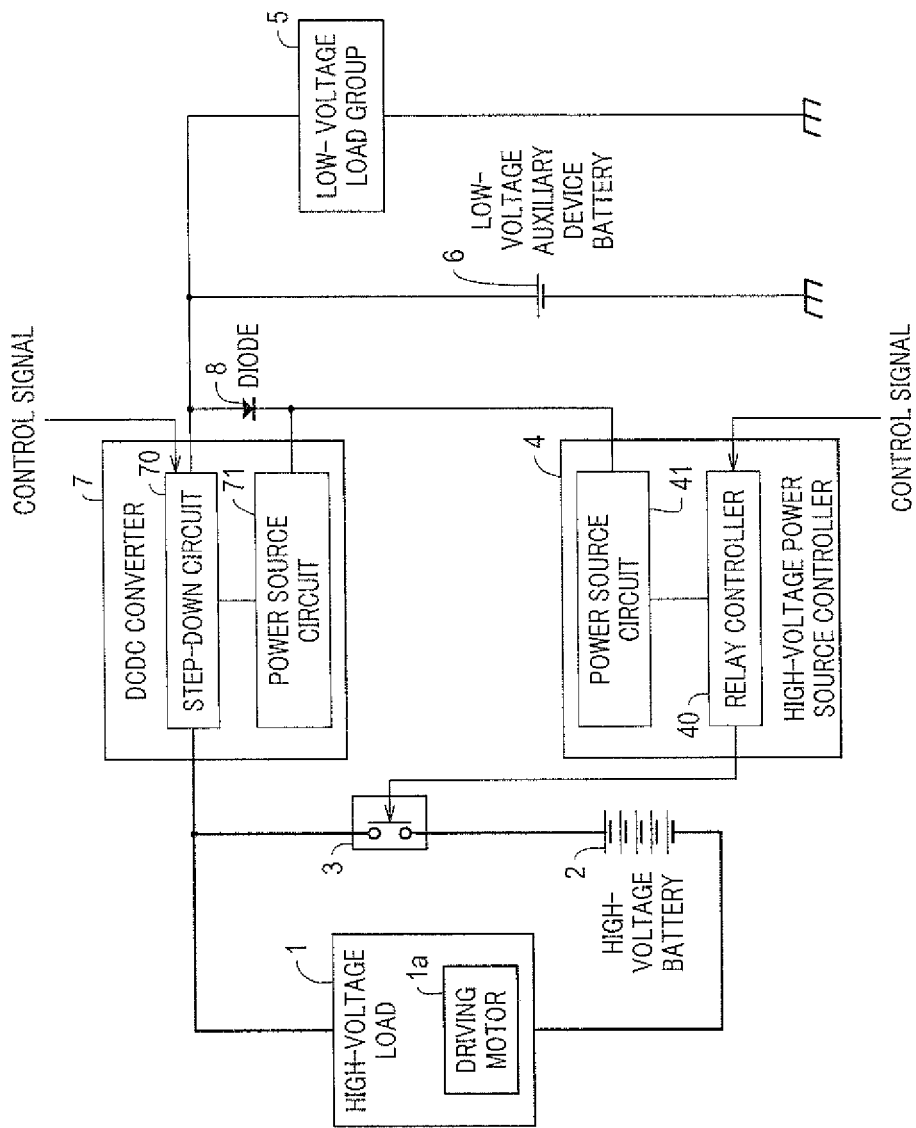
FIG. 1 is a schematic showing a structure of main portions of a related art power source device for a vehicle used for a hybrid vehicle or an electric vehicle.
Figure 2:
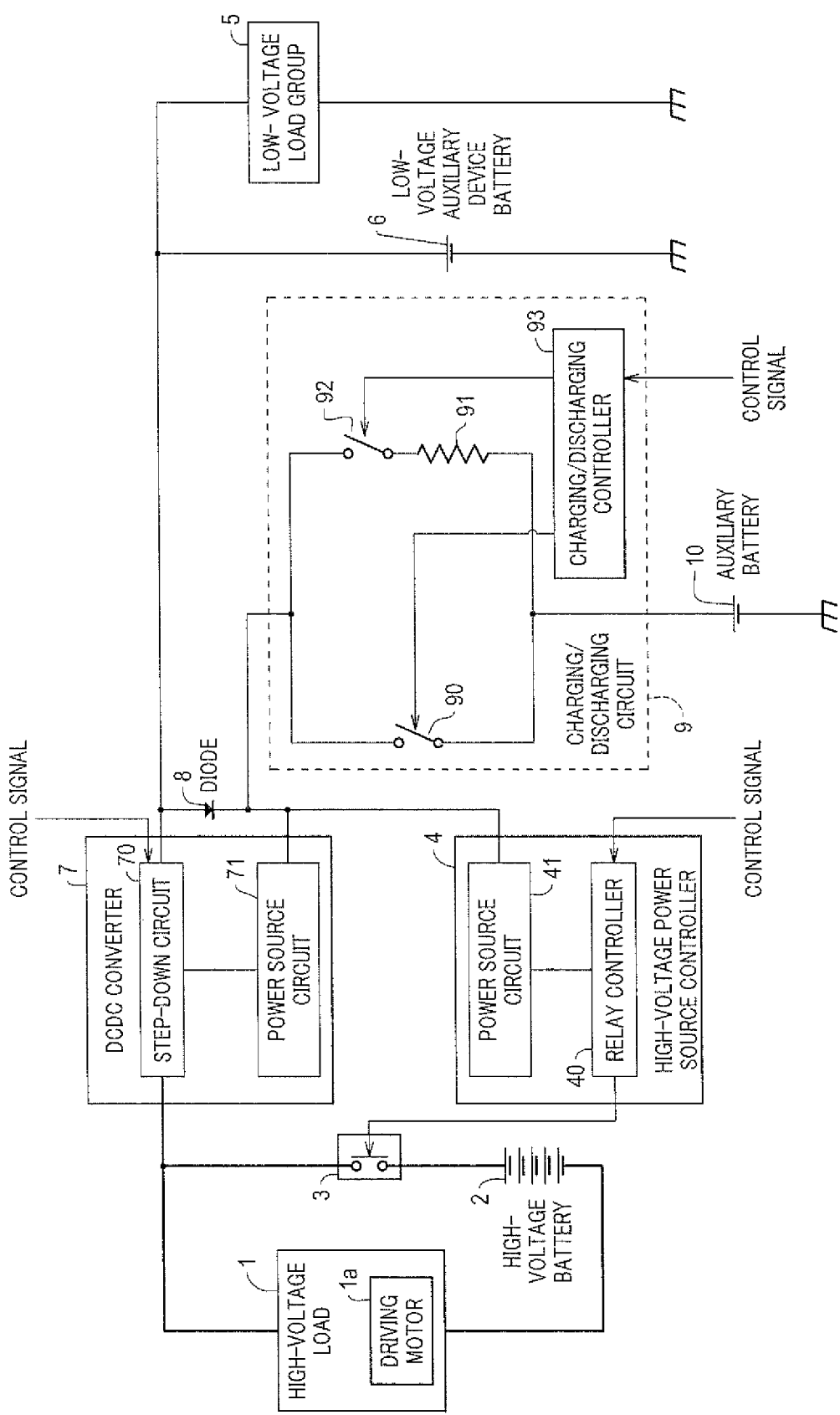
FIG. 2 is a schematic showing a structure of main or significant portions of an embodiment of a power source device for a vehicle.

FIG. 2 is a schematic showing a structure of main or significant portions of an embodiment of a power source device for a vehicle.

The power source device for a vehicle is provided with a high-voltage load 1, a high-voltage battery 2 (first battery) that supplies power to the high-voltage load 1, and a relay contact 3 (switch) connected between the high-voltage load 1 and a cathode terminal of the high-voltage battery 2. The high-voltage load 1 is provided with a driving motor 1a, and a circuit attached to the driving motor 1a. Power is supplied from the high-voltage battery 2 to the high-voltage load 1 via the relay contact 3. Furthermore, in a hybrid vehicle, the high-voltage load 1 also functions as a generator that works together with engine (not shown). The high-voltage battery 2 is a nickel hydrogen battery, in which, for example, many cells are connected in series and parallel, and outputs several hundred volts.

A relay controller 40 (controller) within a high-voltage power source controller 4 controls on and off of the relay contact 3. The relay controller 40 is given a control signal corresponding to operations of a power switch (not shown) that begins and ends driving.

If the relay controller 40 receives, by the operation that begins driving, a control signal that requests that the relay contact 3 be turned on, then the relay controller 40 supplies excitation power to a relay coil (not shown) arranged in the vicinity of the relay contact 3 and turns on the relay contact 3. Additionally, the high-voltage power source controller 4 is provided with a power source circuit 41 (first power source circuit) that supplies power to the relay controller 40, and power is supplied to the power source circuit 41 from a low-voltage auxiliary device battery 6 (second battery) and an auxiliary battery 10, which is disclosed below.

If the relay controller 40 receives, by the operation that ends driving, a control signal that requests that the relay contact 3 be turned off, then the relay controller 40 stops supplying power to the relay coil, and the relay contact 3 is turned off. The high-voltage battery 2 stops supplying power to the high-voltage load 1.

Furthermore, the power source device for a vehicle of this embodiment also includes a low-voltage load group 5 (electric load), and the low-voltage auxiliary device battery 6 that supplies power to the low-voltage load group 5. A step-down circuit 70 within a DC/DC converter 7 is connected between: (i) a connecting node of the high-voltage load 1 and the relay contact 3, and (ii) a cathode terminal of the low-voltage auxiliary device battery 6. The step-down circuit 70 steps down a voltage (absolute value) at the connecting node of the high-voltage load 1 and the relay contact 3, and gives the voltage to a low-voltage auxiliary device battery 6 side terminal. The power source circuit 71 (second power source circuit) supplies power to the step-down circuit 70 and is supplied with power from the low-voltage auxiliary device battery 6 and the auxiliary battery 10.

The power source device for a vehicle of this embodiment includes: a diode 8, a charging/discharging circuit 9, and the auxiliary battery 10. The diode 8 is arranged on a path by which the low-voltage auxiliary device battery 6 supplies power to the power source circuit 41 and the power source circuit 71. Plus side terminals of the power source circuits 41 and 71 are each connected to a cathode of the diode 8. The cathode terminal of the low-voltage auxiliary device battery 6 and the low-voltage auxiliary device battery 6 side terminal of the step-down circuit 70 are connected to an anode of the diode 8. Additionally, the charging/discharging circuit 9 and the auxiliary battery 10 are connected in series between the cathode of the diode 8 and a ground terminal. The diode 8 suppresses the auxiliary battery 10 from supplying power to the low-voltage load group 5, and prevents or impedes output power of the auxiliary battery 10 from being consumed in the low-voltage load group 5.

The auxiliary battery 10 is constituted by a lithium ion battery or a nickel hydrogen battery, and supplies power to the power source circuits 41 and 71 via the charging/discharging circuit 9. The auxiliary battery 10 is constituted by a plurality of cells. Furthermore, if the relay contact 3 is turned on, then the auxiliary battery 10 is charged with power from the high-voltage battery 2 via the charging/discharging circuit 9 from the step-down circuit 70.

The charging/discharging circuit 9 is constituted by a switch 90 (second switch), a current limiting resistor 91, a switch 92 (third switch), and a charging/discharging controller 93 (second controller). The switch 90 is connected between: (i) the connecting node of (a) the plus side terminals of the power source circuits 41 and 71, and (b) the cathode of the diode 8 and (ii) the cathode terminal of the auxiliary battery 10. A current limiting resistor 91 and a switch 92 are connected in series, and a series circuit of the current limiting resistor 91 and the switch 92 is connected in parallel with the switch 90. A charging/discharging controller 93 controls on and off operations of the switches 90 and 92.

Figure 3:
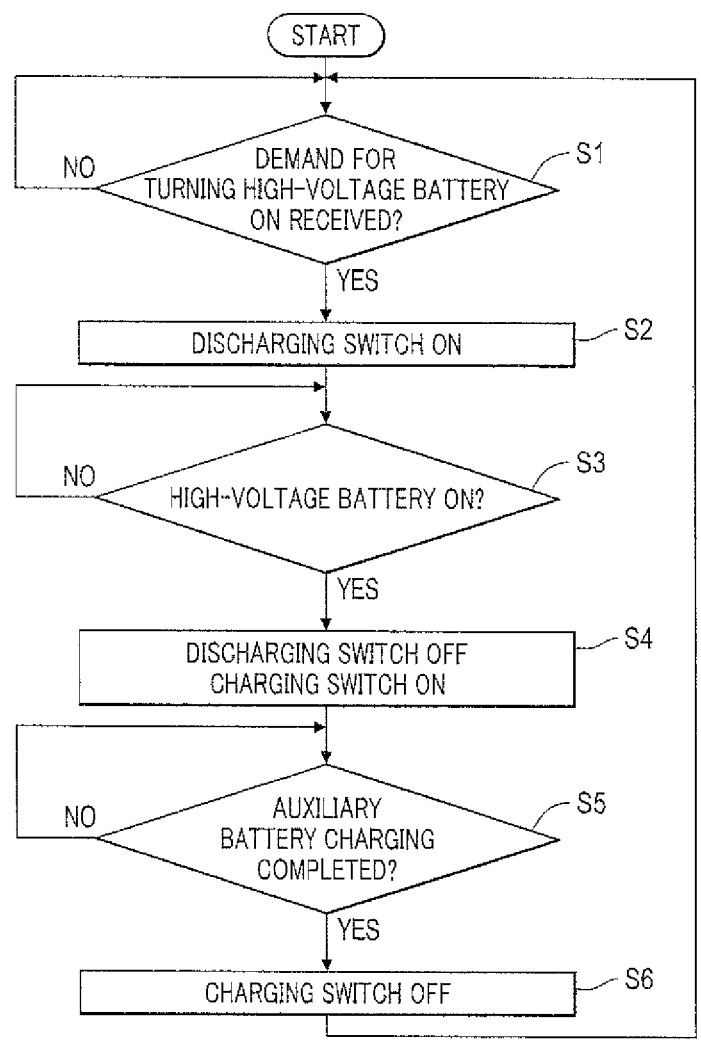
FIG. 3 is a flowchart showing an operation of the power source device for a vehicle in accordance with an embodiment.

The following explains an operation of the thus-constituted power source device for a vehicle with reference to the flowchart of FIG. 3.

FIG. 3 is a flowchart showing an operation of a power source device for a vehicle in accordance with an embodiment.

The charging/discharging controller 93 determines, by the operation that begins driving a vehicle, whether a control signal is received that demands that the high-voltage battery 2 be turned on (the relay contact 3 be turned on) (S1). If a control signal is not received that demands that the high-voltage battery 2 be turned on (S1: NO), then the charging/discharging controller 93 waits until the control signal is received. Additionally, if it is requested that the high-voltage battery 2 be turned on, then both the switches 90 and 92 are turned off.

If the charging/discharging controller 93 receives a control signal that requests that the high-voltage battery 2 be turned on (S1: YES), then the switch 90, which is a discharging switch (S2), is turned on.

By so doing, the auxiliary battery 10 supplies power to the power source circuits 41 and 71 via the switch 90, which is not connected to the current limiting resistor 91. The power source circuit 41 is supplied with power from the low-voltage auxiliary device battery 6 and the auxiliary battery 10, and supplies power to the relay controller 40. The power source circuit 71 is supplied with power from the low-voltage auxiliary device battery 6 and the auxiliary battery 10, and supplies power to the step-down circuit 70. The relay controller 40 receives a control signal that requests the high-voltage battery 2 be turned on and supplies excitation power to the relay coil arranged in the vicinity of the relay contact 3.

Additionally, the low-voltage auxiliary device battery 6 supplies power to the low-voltage load group 5, but the output power of the auxiliary battery 10 is not consumed by the low-voltage load group 5. This is because the auxiliary battery 10 is suppressed by the diode 8 from supplying power to the low-voltage load group 5.

Next, the charging/discharging controller 93 determines whether the high-voltage battery 2 is turned on (whether the relay contact 3 is turned on) (S3). The charging/discharging controller 93 determines whether the high-voltage battery 2 is turned on by detecting a voltage at the low-voltage auxiliary device battery 6 side terminal of the step-down circuit 70. If the high-voltage battery 2 is turned on, then the step-down circuit 70 steps down the output voltage of the high-voltage battery 2 and provides the stepped-down output voltage to the low-voltage auxiliary device battery 6 side terminal. At that time, a voltage at the low-voltage auxiliary device battery 6 side terminal increases. By detecting this increase, it is confirmed that the high-voltage battery 2 is turned on.

Additionally, the method of determining whether the high-voltage battery 2 is turned on is not limited to the method of detecting a voltage at the low-voltage auxiliary device battery 6 side terminal of the step-down circuit 70. For example, the charging/discharging controller 93 may also receive state information from the high-voltage power source controller 4 and determine whether the high-voltage battery 2 is turned on according to the state information.

If the charging/discharging controller 93 determines that the high-voltage battery 2 is not turned on (S3: NO), then the switch 90, which is a discharging switch, is kept on, and the auxiliary battery 10 continues to supply power to the power source circuit 41.

If the charging/discharging controller 93 determines that the high-voltage battery 2 is turned on (S3: YES), the switch 90, which is a discharging switch, is turned off, and the switch 92, which is a charging switch, is turned on (S4). If the relay contact 3 is turned on, and the high-voltage battery 2 is turned on, then the auxiliary battery 10 is provided a voltage of the high-voltage battery 2 that has been stepped down at the step-down circuit 70. At this time, because the charging/discharging controller 93 turns the switch 90 off and turns the switch 92 on, the auxiliary battery 10 supplies output power of the high-voltage battery 2 from the step-down circuit 70 via the current limiting resistor 91 and the switch 92. The current limiting resistor 91 limits the current between the step-down circuit 70 and the auxiliary battery 10.

Next, the charging/discharging controller 93 determines whether the auxiliary battery 10 has been completely charged (S5). The charging/discharging controller 93 observes a cell voltage of the auxiliary battery 10. By comparing the cell voltage with a predetermined voltage and detecting that the cell voltage has exceeded a predetermined voltage, it is determined that the auxiliary battery 10 has been completely charged. The predetermined voltage is determined based on the cell voltage when the auxiliary battery 10 is fully charged.

If the charging/discharging controller 93 determines that charging of the auxiliary battery 10 has not been completed (S5: NO), charging of the auxiliary battery 10 continues as the switch 90, which is a discharging switch, is kept off and the switch 92, which is a charging switch, is kept on.

If the charging/discharging controller 93 determines that charging of the auxiliary battery 10 has been completed (S5: YES), then the switch 92, which is a charging switch, is turned off (S6). Because the charging/discharging controller 93 turns the switch 92 off, both the switches 90 and 92 are turned off, and the auxiliary battery 10 holds charged power. The power source circuits 41 and 71 are supplied with power from the high-voltage battery 2 via the step-down circuit 70, or from the low-voltage auxiliary device battery 6.

After the charging/discharging controller 93 turns the switch 92 off in step S6, the program returns to step S1, and waits until a control signal is received that requests that the high-voltage battery 2 be turned on.

If driving of the vehicle has been completed, the relay controller 40 that has received, by the operation that ends the driving, a control signal that requests that the high-voltage battery 2 be turned off (the relay contact 3 be turned off) stops supplying power to the relay coil and turns the high-voltage battery 2 off.

If, by the operation that begins driving a vehicle, a control signal is again received that requests that the high-voltage battery 2 be turned on (S1: YES), then the charging/discharging controller 93 repeats the above-described operations (see FIG. 3). In step S5, by charging the auxiliary battery 10 with at least power by which the relay controller 40 can turn the relay contact 3 on, the high-voltage battery 2 can be turned on regardless of the voltage value output by the low-voltage auxiliary device battery 6.

The invention claimed is:

1. A power source device for a vehicle that includes a driving motor and an electric load mounted on the vehicle, the power source device comprising:
    a first battery that supplies power to the driving motor of the vehicle, the first battery including a cathode;
    a switch that is connected between the cathode terminal of the first battery and the driving motor, the switch including a terminal at a side of the driving motor;
    a controller that controls on and off operations of the switch;
    a second battery that supplies power to the electric load mounted in the vehicle, the second battery including a cathode terminal;
    a step-down circuit that is connected between: (i) the terminal of the switch, and (ii) the cathode terminal of the second battery, steps down an output voltage of the first battery, and provides the stepped-down voltage to the cathode terminal of the second battery, the step-down circuit including a connecting node;
    a first power source circuit that supplies power to the controller;
    a second power source circuit that supplies power to the step-down circuit, the first and second power source circuits being supplied with power from the second battery and including a connecting node;
    a diode that is connected, in a forward direction, between: (i) the connecting node of the step-down circuit and the second battery, and (ii) the connecting node of the first and second power source circuits, the diode including a cathode; and
    a third battery having a cathode terminal connected to the cathode of the diode via a charging circuit and a discharging circuit for charging and discharging the third battery.

2. The power source device for a vehicle of claim 1, further comprising:
    a second switch that is connected between: (i) a cathode terminal of the third battery, and (ii) the connecting node of: (a) the first and second power source circuits, and (b) the diode;
    a series circuit of a current limiting resistor and a third switch, the series circuit being connected in parallel to the second switch;
    a receiver that receives a signal that demands that the switch be turned on;
    a determiner that determines that the switch is turned on;
    a detector that detects an output voltage of the third battery;
    a comparer that compares the voltage detected by the detector with a predetermined voltage; wherein
        if the receiver receives the signal, then the second switch is turned on; and
        if the determiner determines that the switch is turned on, then the second switch is turned off and the third switch is turned on; and
    a second controller that turns off the third switch if the output voltage of the third battery exceeds the predetermined voltage upon comparing by the comparer.

3. The power source device for a vehicle of claim 1, wherein the third battery is a lithium ion battery or a nickel hydrogen battery.

4. The power source device for a vehicle of claim 1, wherein the first battery is a nickel hydrogen battery, in which multiple cells are connected in series and parallel.

* * * * *